UNITED STATES PATENT OFFICE.

JOHN ZEHNER AND CHARLES ZEHNER, OF BELLEVUE, OHIO.

PROCESS OF PRESERVING MEATS.

SPECIFICATION forming part of Letters Patent No. 512,786, dated January 16, 1894.

Application filed April 19, 1893. Serial No. 471,037. (No specimens.)

*To all whom it may concern:*

Be it known that we, JOHN ZEHNER and CHARLES ZEHNER, citizens of the United States, residing at Bellevue, in the county of Huron and State of Ohio, have invented a new and useful Improvement in Processes of Curing Beef, of which the following is a specification.

Our invention relates to the curing of meats in order that they may be preserved through warm weather and remain unaffected in condition during changes of temperature.

Briefly stated, our process consists in first chopping the meat and simultaneously adding thereto a curing liquid, then packing in suitable sacks, subsequently smoking and drying for use, and finally coating the sacks to exclude the air.

In preparing the beef we remove all of the fatty and stringy portions previous to reducing or dividing, after which the meat is placed in an ordinary chopping or sausage machine, and, during the process of dividing, a solution containing white sugar, saltpeter and salt brine is added. The proportion of these materials composing the solution are approximately as follows: For one hundred pounds of meat we use one pound of white sugar, one pound of saltpeter and two gallons of salt brine, fifty degrees strong, and made of rock salt and pure spring water. After the meat has been finely divided or comminuted it is allowed to stand for several hours after which it is packed and compressed firmly into muslin sacks, the dimensions of which may be varied to suit the packer but are preferably from two to four inches in diameter and about sixteen inches in length. The sacks of meat are then subjected for a period of about sixty hours to cold hickory-wood smoke after which they are suspended and allowed to dry. When the meat has become dry enough to slice or chip the sacks are dipped in a solution of dextrine in order to form a coating upon the exterior of the sack to exclude the air. In the above solution the proportions are two pounds of dextrine to one gallon of water.

From the above description it will be seen that the meat is exposed to the curing liquid during the chopping process, and hence such curing liquid is caused to reach each particle of meat. The advantage of this, in addition to the fact that the curing liquid is thus brought more intimately into contact with the meat, is that less time is required to accomplish this step. It will be noted, furthermore, that the meat is smoked prior to the coating of the sacks in which it is contained, and hence this step in the process can be effectually accomplished.

Having described our invention, what we claim is—

A process of preserving meats, the same consisting in first dividing or comminuting and simultaneously adding a curing solution, then packing in suitable pervious containers, subsequently smoking and drying, and finally coating the sacks with a solution of dextrine, substantially as specified.

In testimony that we claim the foregoing as our own we have hereto affixed our signatures in the presence of two witnesses.

JOHN ZEHNER.
CHARLES ZEHNER.

Witnesses:
WM. LOEW,
H. A. SCHLICHT.